US 9,204,099 B2

(12) United States Patent
Brown

(10) Patent No.: US 9,204,099 B2
(45) Date of Patent: Dec. 1, 2015

(54) VIDEOCONFERENCING SYSTEM PROVIDING VIRTUAL PHYSICAL CONTEXT

(71) Applicant: MAGOR COMMUNICATONS CORPORATION, Ottawa (CA)

(72) Inventor: David Brown, Nepean (CA)

(73) Assignee: MAGOR COMMUNICATIONS CORPORATION, Ottawa, ON (CA)

( * ) Notice: Subject to any disclaimer, the term of this patent is extended or adjusted under 35 U.S.C. 154(b) by 92 days.

(21) Appl. No.: 13/755,099

(22) Filed: Jan. 31, 2013

(65) Prior Publication Data

US 2013/0194378 A1 Aug. 1, 2013

Related U.S. Application Data

(60) Provisional application No. 61/593,381, filed on Feb. 1, 2012.

(51) Int. Cl.
*H04N 7/14* (2006.01)
*H04N 7/15* (2006.01)

(52) U.S. Cl.
CPC ..................... *H04N 7/152* (2013.01)

(58) Field of Classification Search
None
See application file for complete search history.

(56) References Cited

U.S. PATENT DOCUMENTS

| | | | |
|---|---|---|---|
| 2006/0259552 A1* | 11/2006 | Mock et al. | 709/204 |
| 2007/0279484 A1* | 12/2007 | Derocher et al. | 348/14.09 |
| 2007/0285506 A1 | 12/2007 | Schneider | |
| 2008/0170550 A1* | 7/2008 | Liu et al. | 370/338 |
| 2008/0267282 A1 | 10/2008 | Kalipatnapu et al. | |
| 2011/0047487 A1 | 2/2011 | DeWeese et al. | |
| 2011/0187813 A1 | 8/2011 | Musgrave | |
| 2011/0205332 A1 | 8/2011 | Jeong et al. | |
| 2012/0154255 A1* | 6/2012 | Hinckley et al. | 345/1.3 |
| 2013/0070045 A1* | 3/2013 | Meek | 348/14.07 |
| 2013/0198785 A1* | 8/2013 | Arling et al. | 725/62 |
| 2013/0198795 A1* | 8/2013 | Eleftheriadis et al. | 725/118 |

OTHER PUBLICATIONS

"Multiview: Improving Trust in Group Video Conferencing Through Spatial Faithfulness", David Nguyen et al., Berkeley Institute of Design, University of California, ACM Conference on Human Factors in Computer Systems, 2007, pp. 1465-1474.
"eyeView: Focus+Context Views for Large Group Video Conferences", T. Jenkin et al., Queens University, Kingston, ON, Proceedings of the ACM Conference on Human Factors in Computer Systems (CHI), 2006, pp. 1497-1500.
"Development of Teleconferencing Methodologies With Emphasis on Virtual Space Video and Interactive Graphics", Linda B. Allardyce et al., DARPA Technical Report, Washington, D.C., DDI/TR 83-4-314.73, Apr. 1983, pp. 1-88.
"Virtual Video Conferencing Using 3D Model-Assisted Image-Based Rendering", Peter Eisert, Fraunhofer Institute for Telecommunications, Image Processing Department, Berlin, Germany.

* cited by examiner

*Primary Examiner* — Maria El-Zoobi
(74) *Attorney, Agent, or Firm* — Marks & Clerk

(57) ABSTRACT

In a teleconferencing system, multiple parties participate in a teleconference from different locations. The system is configured such that a filmstrip containing simultaneous images or icons representing the participants are displayed on one or more display screens at a conference location in a spatial relationship that represents their real-world or virtual-world spatial relationships.

10 Claims, 9 Drawing Sheets

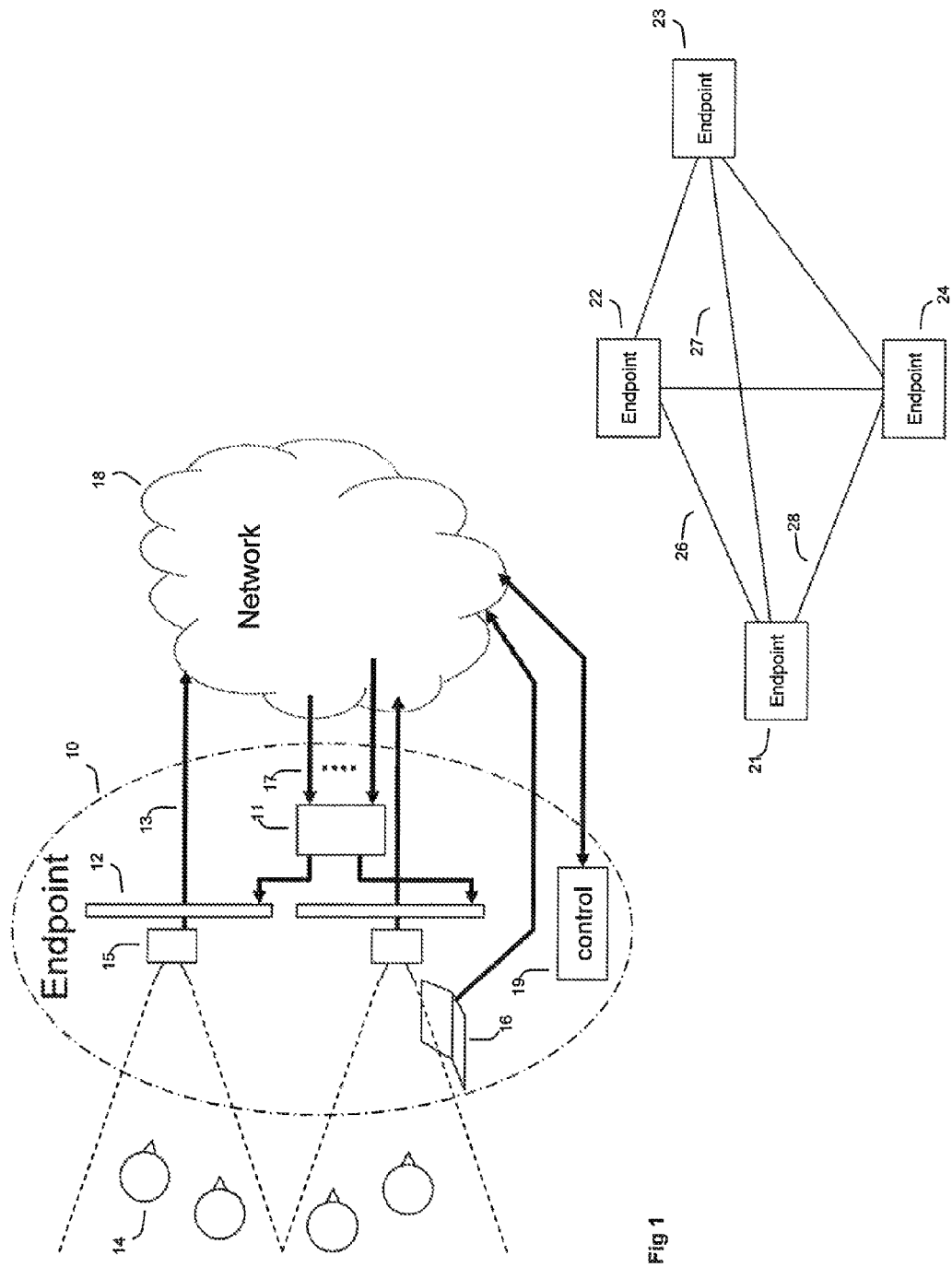

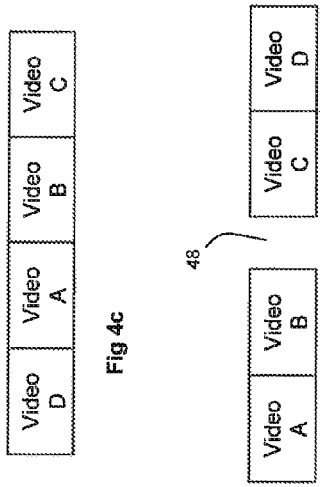
Fig 4c
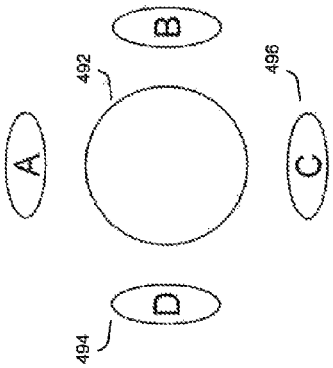
Fig 4d
Fig 4e
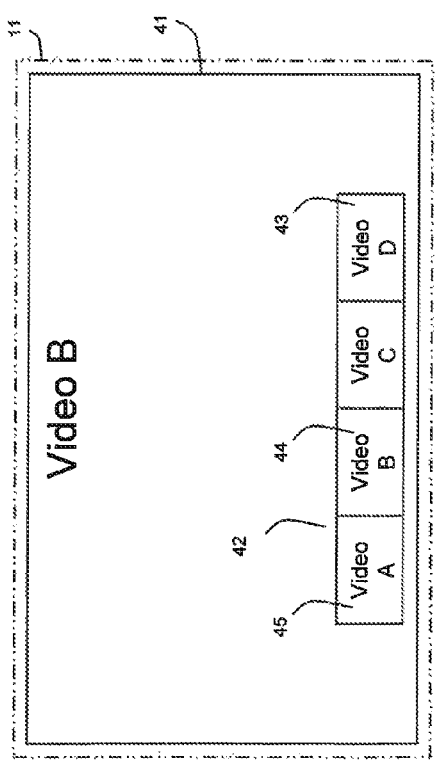
Fig 4a
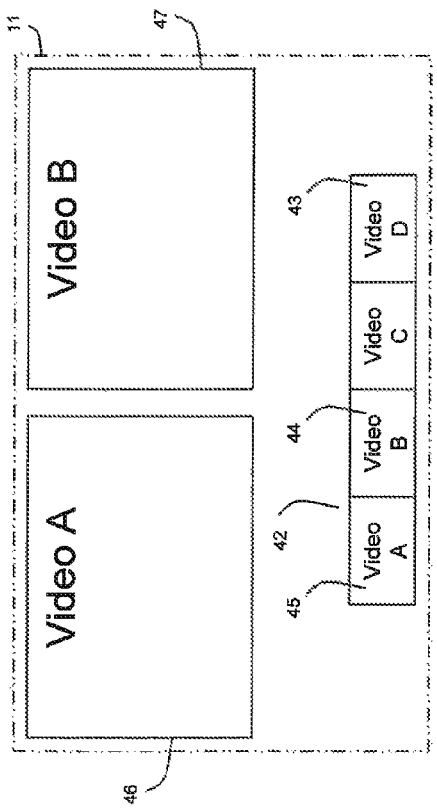
Fig 4b

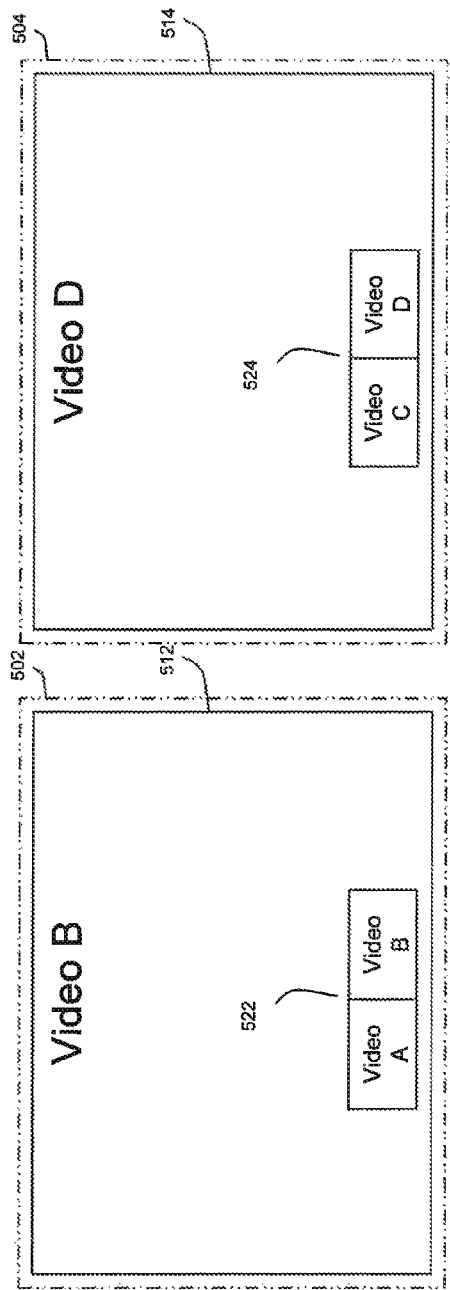
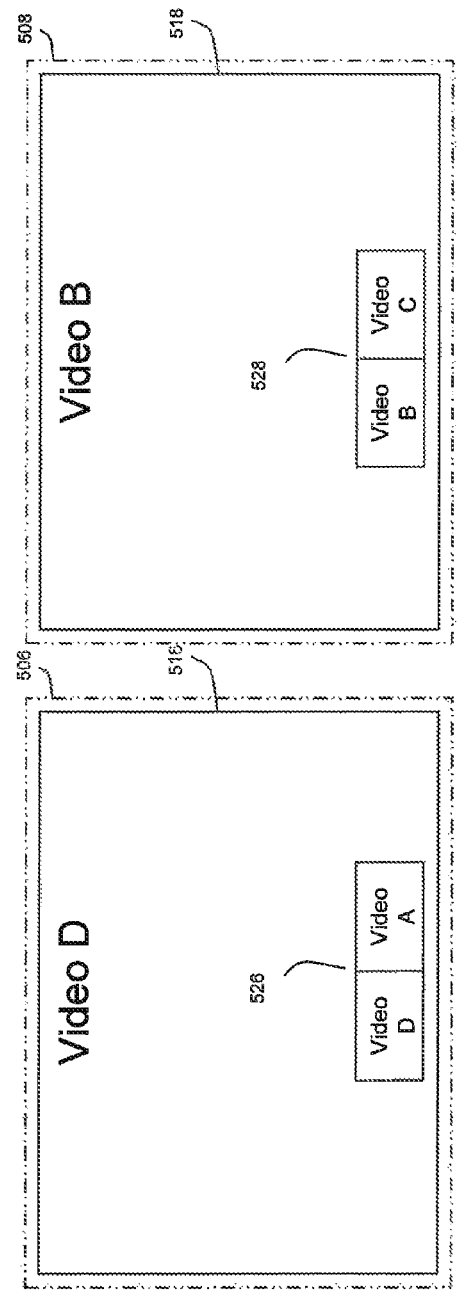
Fig 5a
Fig 5b

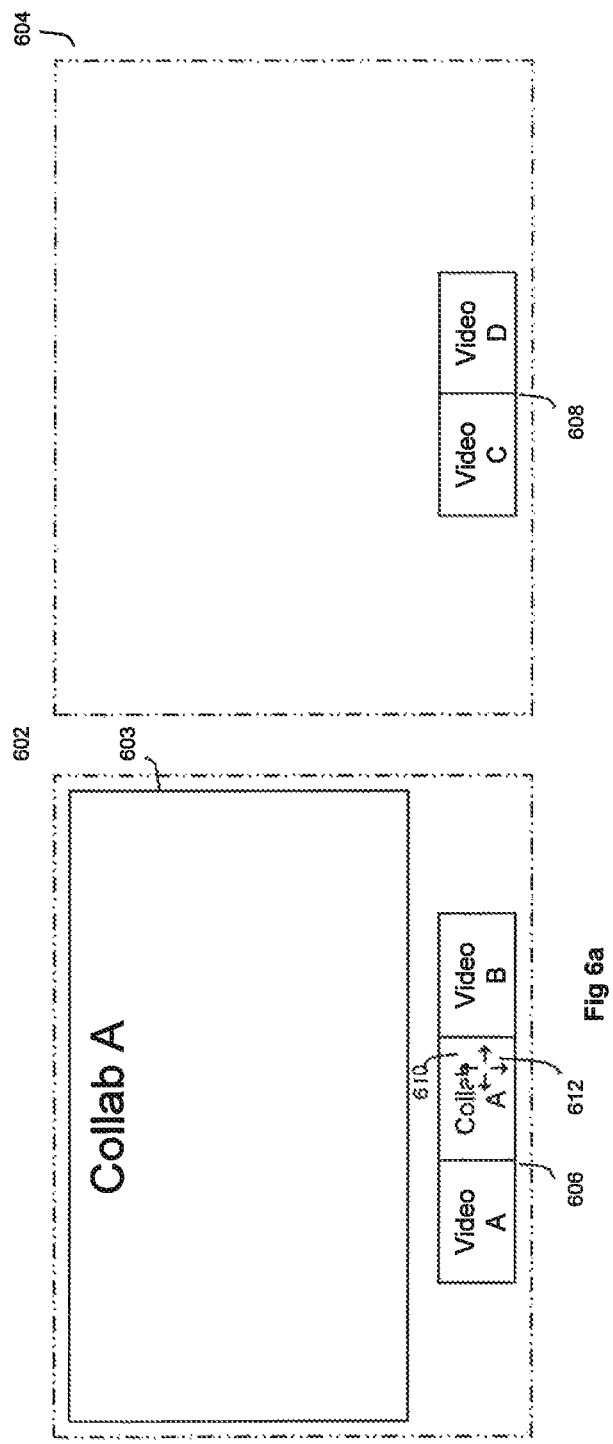

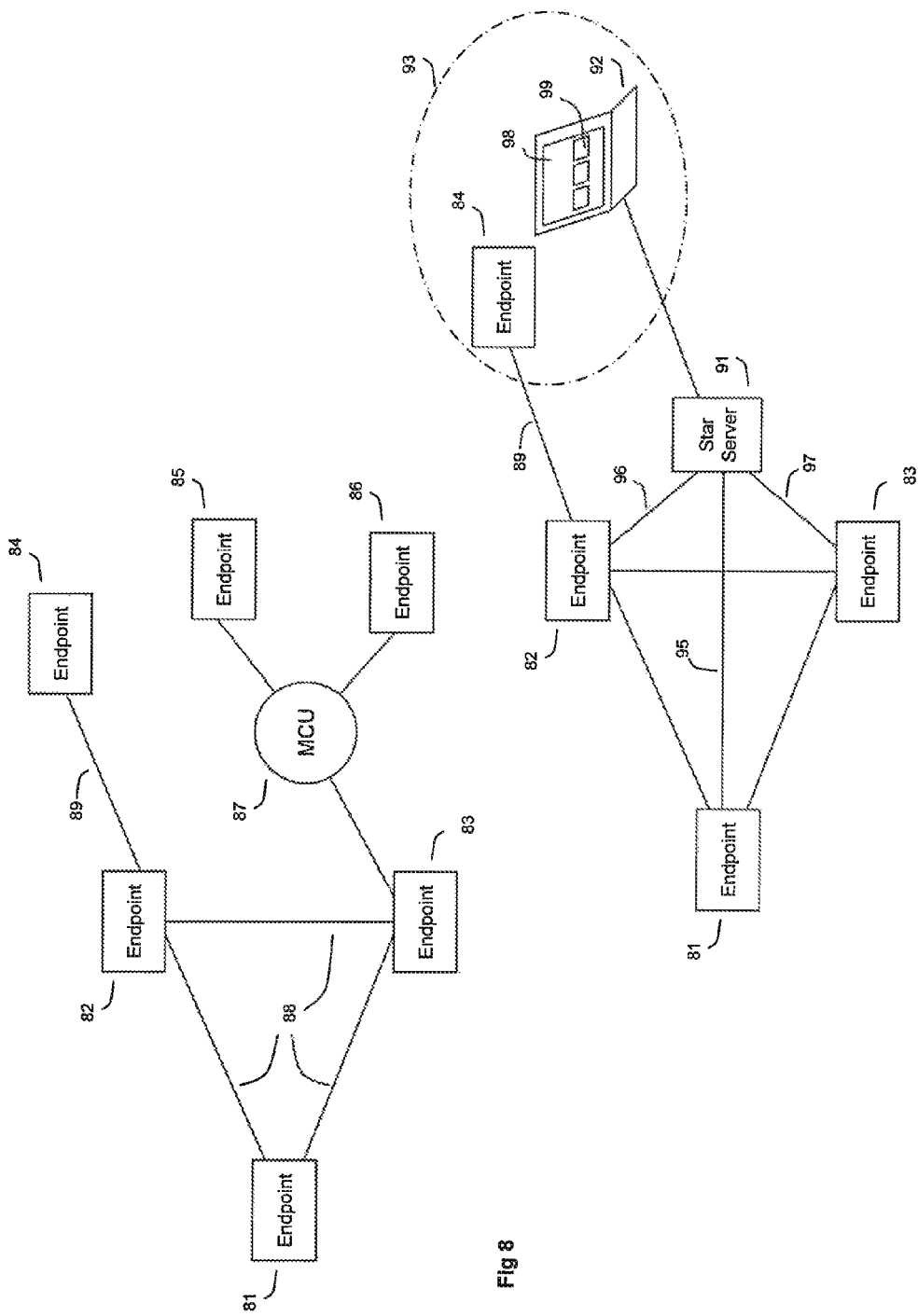

VIDEOCONFERENCING SYSTEM PROVIDING VIRTUAL PHYSICAL CONTEXT

CROSS REFERENCES TO RELATED APPLICATION

This application claims the benefit under 35 USC 119(e) of U.S. provisional application No. 61/593,381, the contents of which are herein incorporated by reference.

FIELD OF THE INVENTION

This invention relates to the field of videoconferencing, and in particular to a videoconferencing system that provides a virtual physical context for a multiparty video call, and which in one aspect is applicable to mixed topology conferencing networks.

BACKGROUND OF THE INVENTION

Video conferencing permits people to meet without traveling. Unfortunately the video conferencing experience can be unsatisfactory when compared to a real meeting room with the same people. In a multiparty video call there are multiple video images (usually at least one from each end-point). If there are more images than video monitors, the images will be rendered at a small scale or viewed one at a time by some multiplexing technique. It is often difficult to view individual images at full scale and quickly sort between multiple images.

It is also often difficult to tell what the people at the remote videoconference site are looking at. If multiple sites are connected in a single call (a multiparty video call) it is not clear who is talking to whom.

Multi-party videoconferences are typically hosted by a Multiparty Control Unit (MCU) also known as a Multipoint Conference Unit. The MCU consolidates all the video feeds from the end points and presents appropriate video images to each of the end points of all the video camera and collaboration material video feeds in the conference.

MCUs typically permit limited independent control of what images are promoted to full-scale size. Common techniques for full-scale selection are to permit 'paging' between individual images or to enable automatic promotion of single images or image-combinations using audio or manual cues.

MCU's do not have a sense of physical location or proximity of materials in the conference. No physical layout information is preserved or inferred in presentation. FIG. 3a illustrates a typical MCU screen layouts. In the simplest case the screen 31 is simply divided into equal sized panes 32 with no weight given to any remote endpoint video.

Alternatively, as shown in FIG. 3b Video A of the current talker at is rendered in the largest "pane" 33, other participant Videos B, C and D are rendered in the smaller panes 34. A moment later a participant at location B picks up the conversation and the MCU switches the panes so that Video B is rendered in large pane 33 and Video A is rendered in a smaller pane 34. This is shown in FIG. 3c. Typical MCUs offer a number of layout designs with different numbers of panes but all are characterized by lack of an overall consistent positioning of video panes relative to one another. Video pane labels to some degree help participants follow the conversation especially if video source switching is also employed at some distant endpoints. One pane, often the smallest, displays the local video as other endpoints will see it.

Radvision SCOPIA Elite 5000 MCU is typical of current technology. By default all endpoints receive the same video stream. The layout of this stream is setup by a moderator. Users at any endpoint may setup a "personal conference layout" but doing this is a multistep procedure involving a number of dialog boxes.

The term "Telepresence" is used to refer to a videoconference system having certain characteristics addressing the general problem of making a videoconference more like a face-to-face meeting. High definition video renders participants life-size on large screens, arranged typically in a row and often borderless, wideband stereo or multichannel sound are used to create a lifelike impression of distant parties with the objective of giving the illusion that they are actually sitting across the table. Various methods are used to address the problem which arises when there are more video streams to show than there are monitors to show them.

Cisco TelePresence Multipoint Switch (CTMS) is a typical MCU for use in a telepresence environment. In order to satisfy conflicting requirements of displaying all meeting participants life-size on a limited number of monitors voice activated switching is used. Switching may be at a site level, i.e. the site(s) with the current and most resent talkers are displayed. In the case of a site(s) with more than one or two participants multiple cameras may be "segment" switched making the current or most recent talker visible at distant endpoints. As is typical in such system the local user interface that is used to control layout, e.g. place a "presentation-in-picture", or alternatively on a separate monitor, is controlled via dialog boxes on a control device, e.g. laptop PC. The essence of the problem with multiparty conferences is that video cameras render a three-dimensional world on a two-dimensional video monitor. There has been some research in rendering spatially appropriate video images; see references 1 and 2 below.

In a multipoint conference employing an MCU endpoints are interconnected in a star, or multi-star, topology. In an alternative configuration, known as mesh configuration and illustrated in FIG. 2, each endpoint is connected directly to each other endpoint in the conference. In such an arrangement each endpoint has complete freedom to present video and other collaboration material uniquely and independently of the way it is presented at other endpoints.

In the past mesh endpoints have been built on standard GUI frameworks. This allows users extreme flexibility in that they can move, shape, minimize, maximize, bring forward, send back, cascade, etc. windows each representing video or collaboration material from other endpoints in a call. However, all this flexibility is both tedious and distracting in the context of a meeting.

Various approaches have been considered in the prior art:—See, for example, "Multiview: improving trust in group video conferencing through spatial faithfulness", Nguyen, D. T., Canny, J.; ACM conference on Human Factors in Computer Systems, 2007, pp. 1465-1474; Berkeley Institute of Design; and "eyeView: focus+context views for large group video conferences"; Jenkin, T., McGeachie, J., Fono, D., Vertegaal; Proceedings of the ACM Conference on Human Factors in Computer Systems (CHI), 2006 (extended abstracts), pp. 1497-1500; Human Media Lab of Queens' University Canada.

The Heinrich Hertz Institute of the Fraunhofer Institute for Telecommunications is also working on 3D video conferencing technologies. A few companies are using emulations of 3D environments like Tixeosoft.

DARPA Technical Report "DDI/IT 83-4-314.73", Linda B. Allardyce and L. Scott Randall, April 1983.

The DARPA report describes how "realism in conferee relationship is accomplished in two ways. First, at each station, the four conferees (one real and three surrogates) must maintain the same arrangement; that is A is always on B's left, B is always on C's left, and D is always on A's left. . . . The second key. . . . Instead of a single camera transmitting the same image of the real conferee to all other locations, there is an individual camera for each surrogate transmitting the image of the present conferee to the remote station from the surrogate's perspective . . . "

SUMMARY OF THE INVENTION

In one aspect the invention provides an endpoint for a teleconferencing system wherein multiple parties participate in a teleconference from different locations, comprising one or more display screens at a conference location, and which is configured such that a filmstrip containing simultaneous images or icons representing the participants is displayed on said one or more display screens in a spatial relationship that represents their real-world or virtual-world spatial relationships. The images or icons may be in the form of frames containing reduced-size video feeds, which can be promoted to full size by clicking.

Embodiments of the invention thus provide a virtual physical context for a multiparty video call so that there is a sense of position of people and things with respect to each other. This resolves the ambiguity of what or who is being looked at or spoken to. An embodiment of the invention provides a video navigation system that illustrates the positions of people and things in the virtual conference room and facilitates selection of what to look at when there are more images than available video monitors. Even when a single image (amongst several) is enlarged, the remaining scaled-down images are still active and in view.

In the case where multiple live video feeds are presented to one or more video monitors, but where there are more images than monitors embodiments of the invention permit easy selection and promotion to full scale of single images. Promotion of two images to ½ scale and three images to ⅓ scale etc. is permitted. The user interface deliberately is modeled on how common computer window-management systems behave so that users do not have to learn new keystrokes or mouse-actions.

In one embodiment one or more rows of images at ⅙ to ⅑ full scale are always present on the bottom of the screen. By single clicking or double-clicking the left-computer mouse-button the user can promote one or more images to full scale. If the image is a live video feed then the image is rendered at full scale with the bottom of the image partially occluded by the filmstrip images at the bottom of the screen. If the image is of a computer application or desktop then the image is reduced in size so that no part of it is occluded.

Standard user methods including shift-click and control-click are used to select multiple contiguous images or to select/deselect single images are implemented. The video mapping technique in accordance with an embodiment of the invention allows the user o see all actives videos simultaneously while preserving natural gaze angle and position information for a videoconference of more than two endpoints.

This invention permits rapid promotion to full scale of one or more live video feeds while keeping all active feeds in view. In comparison to other systems typically employing an MCU or special purpose hardware, as many Telepresence systems do, the invention works with common hardware and standard operating systems.

In one embodiment the invention facilitates endpoints interconnected in a mesh configuration, eliminating the capital and management cost of an MCU, although does not preclude star configuration.

Another problem arises in mixed topology networks where a number of endpoints are connected in a mesh connection, and at least one endpoint is connected to a mesh-connected endpoint with a non-mesh connection. In this case, it would be desirable to permit the non-mesh connected endpoint to enjoy the same features as the mesh-connected endpoints.

Thus, according to another aspect of the invention there is provided a teleconferencing system comprising a plurality of endpoints, at least some of which are connected in a mesh configuration and at least one of which is connected in a non-mesh configuration to a selected one of the mesh-connected endpoints, and which are configured such that a film strip with frames containing reduced-size video feeds from the conference participants is is displayed at the mesh endpoints; a proxy at the selected mesh-connected endpoint for the non-mesh connected endpoint and connected to each of the mesh-connected endpoints to receive video feeds from the mesh-connected endpoints for the non-mesh connected endpoint; a server associated with the proxy for serving the film strip with frames containing reduced-size video feeds from the mesh-connected conference participants to the non-mesh connected endpoint; and a control connection permitting a user located at the non-mesh connected endpoint to select a video feed on the film strip for promotion to full size and to initiate transfer of the full size video feed to the non-mesh connected endpoint.

BRIEF DESCRIPTION OF THE DRAWINGS

The invention will now be described in more detail, by way of example only, with reference to the accompanying drawings, in which:

FIG. 1 shows a typical mesh connected videoconference end point;

FIG. 2 shows a typical mesh connected four-party call;

FIGS. 4a and 4b show typical screen layouts in accordance with embodiments of the invention;

FIGS. 4c and 4d show filmstrips;

FIG. 4e shows a round table concept;

FIGS. 5a and 5b show screen layouts using two monitors;

FIGS. 6a to 6c show different screen layouts for user at location D;

FIG. 8 depicts a typical prior art mixed topology conference;

FIG. 9 depicts a mixed topology conference with a star server; and

DETAILED DESCRIPTION OF EMBODIMENTS OF THE INVENTION

Figure 3B:
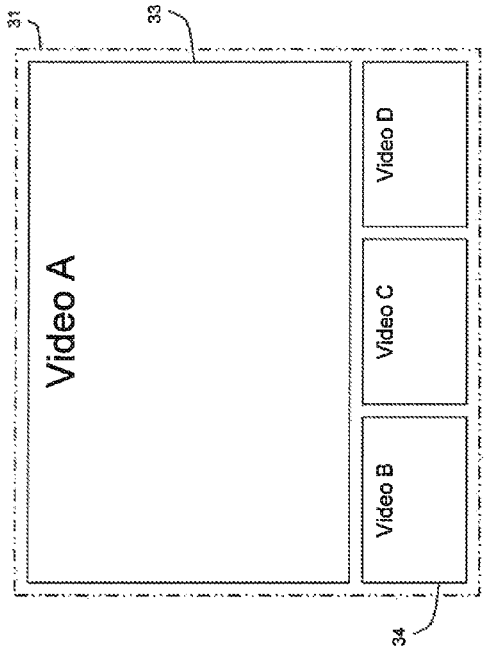
FIGS. 3a to 3c show typical prior art screen layouts.

The use of a filmstrip is a feature of the user interface of a video conferencing endpoint in accordance with embodiments of the invention. The filmstrip consists of a frame strip containing reduced size video feeds from the various participants. Its purpose is to allow users to see video and collaboration material from all conferenced parties and to determine which particular video streams or collaboration materials will be "promoted", that is to say displayed at a larger scale, and how promotions will be initially placed on the screen(s) of the endpoint.

FIG. 1 depicts a typical endpoint 10. It comprises collection of devices managed by a common Call Control software 19 having a single network address (e.g. IP address or URL) used for call set-up. Software implementing the invention is embodied in Display Controller 11. Blocks in the figure are functional representations and do not imply any particular hardware integration. Call Control 19 and Display Controller 11 software could run in with other software in a shared computer or in separate computers.

Conference participants 14 sit before video cameras 15 and in front of monitors 12. The monitors are controlled by display controller 11 and receive multiple video streams and collaboration data 17 from all other endpoints participating in a given conference. Preferably other endpoints also employ the invention. Participants may have collaboration material that they wish to share on a laptop computer 16 or video recording device (not shown) etc.

The endpoints in a multipoint call may be interconnected in a mesh configuration as illustrated by the example in FIG. 2. The figure shows four interconnected endpoints. In a mesh connection media streams and data from all devices at each endpoint, e.g. 21, are streamed independently to and from all other endpoints, e.g. 22, 23 and 24, in the conference via the Network 18 connections 26, 27 and 28 respectively. If, as illustrated in FIG. 1, one endpoint 21 has two video cameras both resulting video streams 13 will be streamed in each of the network connections 26, 27 and 28. It would be understood by someone skilled in the art that the invention could be implement in star connected systems using an MCU(s), possibly as a feature of the MCU, and that multiple camera outputs could be combined in some way before being transmitted to the network.

The invention is most easily understood in the case of an endpoint having a single display screen intended to show video or collaboration material.

Figure 3C:
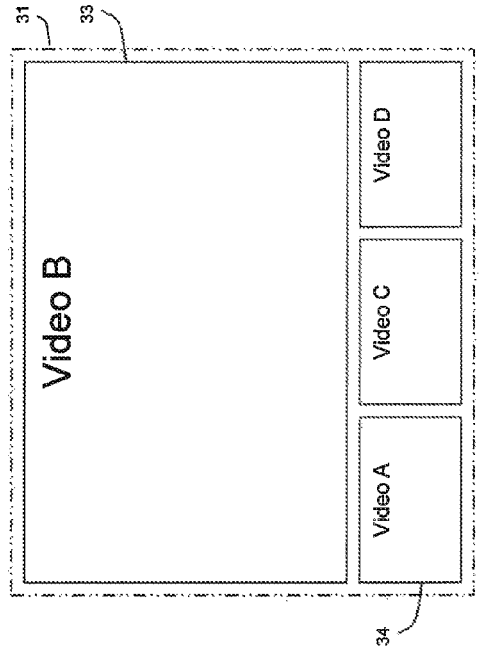
Figure 3A:
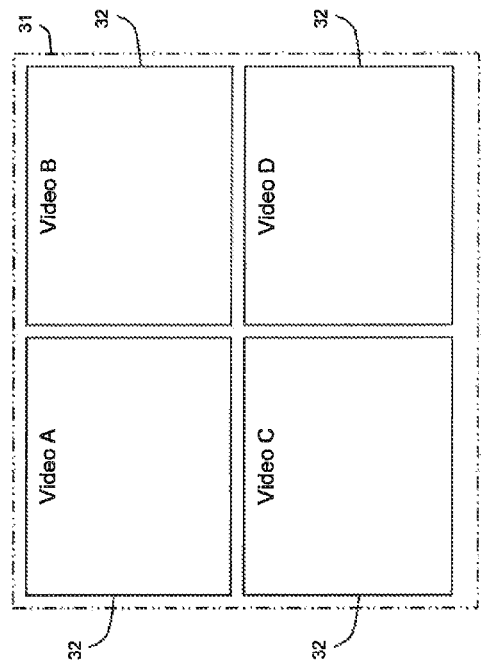

In one embodiment the filmstrip is located near the lower edge of the screen and is a single row of thumbnails of all videos or collaborations (i.e. document, presentation etc.) from all endpoints in the conference. Showing all sources from all distant end point(s) all of the time, even if they have also been promoted to a larger size, is a key differentiator from prior art endpoints (FIG. 3 described above) in which promotion means that a smaller video is removed on promotion.

In the preferred embodiment thumbnails are added to the filmstrip in left to right order as they are added to the call. For example FIG. 4a shows the filmstrip 42 after an endpoint designated D has set up a call with endpoint A and then added endpoints B and C. This ordering is arbitrarily chosen as a method for establishing a virtual round table.

The Round-Table concept is illustrated in FIG. 4e. When the filmstrip or promoted videos are displayed at any given location, they are displayed in a manner reflecting the view from a given endpoint as if all participating endpoints were positioned at a round table 492. For example from the perspective of Endpoint D 494 at the virtual table end point A is to the left, B is in the centre and C is to the right.

This becomes important when another endpoint in the conference also embodies the invention; it is preferred that all endpoints in the conference employ the invention. In another aspect of the invention, "round-table" order will be preserved across the conference.

That is to say that filmstrip at location C, for example, will be displayed as illustrated in FIG. 4c reflecting the view from location C 496 at the same virtual round table 492. Similarly at locations A and B order will be BCDA and CDAB respectively. Note that in this embodiment of the round-table the local view is always at the right end of the filmstrip. Other rules for establishing and presenting round table order are possible and depend on equipment configuration rules. What is important is that all endpoints using the invention in a given call follow the same rules to create the same endpoint ordering around the virtual table 492.

It is preferred that the thumbnails in the filmstrip be displayed in a single row the same height, each $1/6^{th}$ to $1/8^{th}$ the screen height.

Referring to FIG. 4a, in this instance Video B 41 is promoted to fill the full screen 11. According to the invention Thumbnail Video B 44 also appears in the filmstrip. Note that element 41, because it is a video, may use the screen space behind the filmstrip, so the filmstrip can be thought of as a picture-in-picture.

A characteristic of the filmstrip GUI is that common actions like promotion, whether to full screen or shared screen, and demotion are achieved by using well-known GUI direct action methods. A "GUI direct action" means a single user-action. Examples of single user-actions are: single, double, triple click of the right, left, or middle button associated with a mouse or other pointing device while, optionally, the user holds down one of the Shift, Control or other key(s). It does not mean: selecting from a pop-up menu often associated with right click; use of a dialog box; drop down menu. It also does not mean action, direct or otherwise on a device other than the one display, or collection of displays, displaying the filmstrip as well as promotions.

For example, in the preferred embodiment if Video A is promoted, i.e. is occupying the entire screen, then a right-click on Video B thumbnail 44 will promote Video B, swapping it with promoted Video A. the result being as illustrated in FIG. 4a. If now a user now holds the Control key when the thumbnail Video A 45 is right-clicked then the both video A and Video B will be displayed in a predetermined tiled arrangement on the screen as shown in FIG. 4b. Note that the round-table order in the filmstrip is reflected in the way promoted videos are placed in the tile structure. Video A was added to the left of Video B because it is to the left in the filmstrip.

According to well-known practices the user may now adjust the position and size of promoted videos. In the preferred embodiment such user adjustments will be saved and used instead of the predetermined tiled arrangement.

Special limitations apply to the way in which users may adjust the filmstrip. The filmstrip is always the "top" window (i.e. always completely visible on the screen baring operating system exceptions). In the preferred embodiment the only user action affecting the filmstrip's appearance is the user ability to move its position on the screen using any well-known GUI method.

A feature of this aspect of the invention is that when a thumbnail is promoted a second instance of the video stream, or collaboration, is created and displayed at a larger scale. The video displayed in the thumbnail remains active being a miniature version of the promoted video (or Collab).

By default the filmstrip is displayed centrally near the bottom of the screen. In an alternative embodiment of the invention provision is made for a centrally mounted video camera, which partially obscures the screen. The filmstrip will be displayed either side of a pre-configured keep-out zone 48 illustrated in FIG. 4d.

It is preferred that special limitations are applied to the default promotion of Collaboration items that are different from those described above for Video items.

Figure 7A:
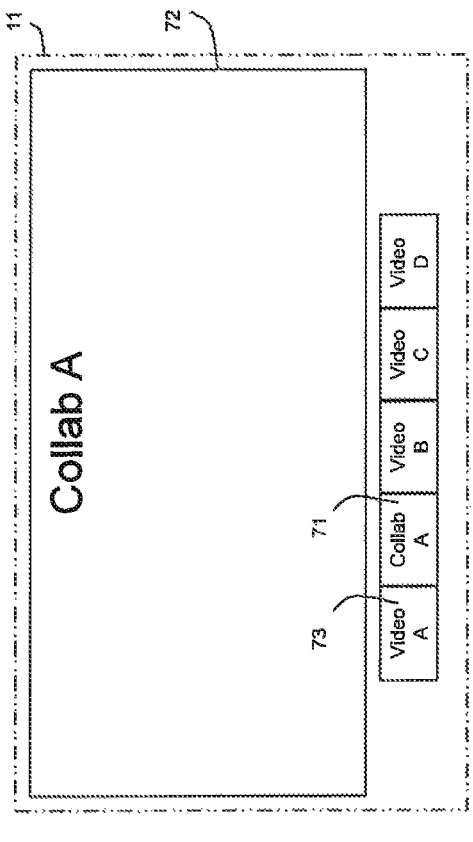
FIGS. 7a and 7b show different screen layouts with promoted collaboration.

For example in the conference illustrated in FIG. 4, a participant at location A wishes to make a presentation and using known methods adds his presentation to the call. This action has the immediate effect at all endpoints in the conference employing the invention of adding a thumbnail to the filmstrip at respective endpoints, including endpoint A. According to a predetermined rule (which may vary depending on room configurations and is based on the assumption all rooms are similarly configured) the Collab thumbnail is positioned immediately to the right of the corresponding Video thumbnail extending the round-table concept. This is illustrated in FIG. 7a as it would appear in the filmstrip at location D. Collab A 71 is to the right of associated Video A 73.

Figure 7B:
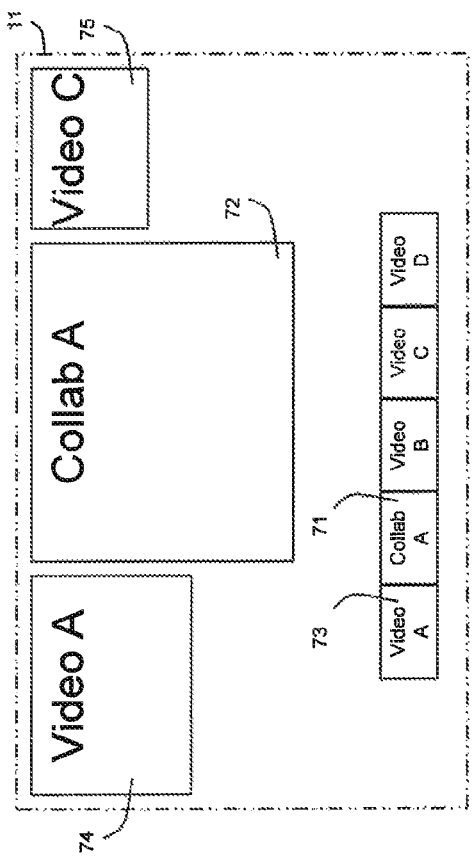

In one variant of the invention any newly added item will immediately be promoted as if the user had right-clicked the newly added thumbnail, 71 in this case. Either by this default means or when the user clicks the thumbnail the Collab is promoted, but it will not be allowed to use the entire screen. The promoted Collab 72 will be constrained not only by other promoted items (not present in this example) but also by the filmstrip. Had any of the promoted videos remained on the screen with Collab A then the promoted Collab would have the same position relative to the promoted Video(s) as its thumbnail does relative to the video(s) thumbnails. FIG. 7b illustrates a possible result when Collab A 72 is displayed at the same time as Video A 74 and Video C 75.

In general it is preferred that Videos and Collabs are treated as separate display object classes allowing for different behavioral rules for the Video Class and the Collab Class. For example, in addition to not being obscured by the filmstrip, when promoting a Collab Class using a right-click it will not swap with a Video Class but add to any promoted Video Class objects, and vice versa.

In the event that the invention is embodied in more than one endpoint all user actions on the filmstrip are local to the user's endpoint.

The filmstrip is useful not only in multipoint calls as described so far but also in point to point calls where one or both locations may have more than one camera, video feed, document, white board, presentation etc to make available to the other party.

The invention so far has been described as it would apply to an endpoint with a single screen. It may be adapted to the case where the endpoint has more than one screen available for conference content presentation.

Referring to FIG. 5a the same 4 party call will be used to illustrate the adaptation to two screens. The filmstrip as described in the single screen case is arbitrarily split between multiple screens by default. In the two screen example left screen 502 filmstrip 522 contains thumbnails for locations A and B and right screen 504 filmstrip 524 contains thumbnails for the remaining location C as well as local video D.

It is preferred that Round-Table order is preserved so that the aggregated filmstrips on a two screen endpoint at location C in the same exemplary four party conference would look as illustrated in FIG. 5b. Note that Round-Table order is also preserved in the promoted Videos too by virtue of the location of the corresponding thumbnails. At location D Video B 512 is displayed on the left screen 502 and Video D 514 (video local to D) is displayed on the right screen 504 see FIG. 5a. At location C Video B 518 is displayed on the right screen 518 and Video D 516 is displayed on the left screen 506 see FIG. 5b.

It is preferred that by default a Video is promoted to the same screen its corresponding thumbnail is located. According to the invention users can drag portions of the filmstrip from one screen to another in order to influence the screen to which promotion will occur. It is preferred that such adjustment of the filmstrip be constrained by the Round-Table rules as illustrated by the following example.

FIG. 6a illustrates a typical two-screen layout. The example is a four-endpoint conference similar to that used above except that endpoint D now has two screens 602 and 604, but the conference composition and state is the same as illustrated in FIG. 7a for a single screen at location D. The filmstrip is, according to the invention, arbitrarily split between the two screens: filmstrip 606 on the left and filmstrip 608 on the right. Because an individual at location A just added Collab material to the conference it is by default preference displayed promoted 603 on location D left screen 602. This is because this is where thumbnail Collab A 610 appears in the filmstrip having been added according to the preferred Round-Table order.

It is now assumed that a user at location D wishes to drag the Collab A Thumbnail 610 to the right screen 604 in order to influence this and future presentations of this conference. The user presses the mouse on the thumbnail and typical Windows icon 612 indicates to the user that the object under the icon, in this case the thumbnail 610, can now be dragged with the mouse until it is released.

Figure 6B:
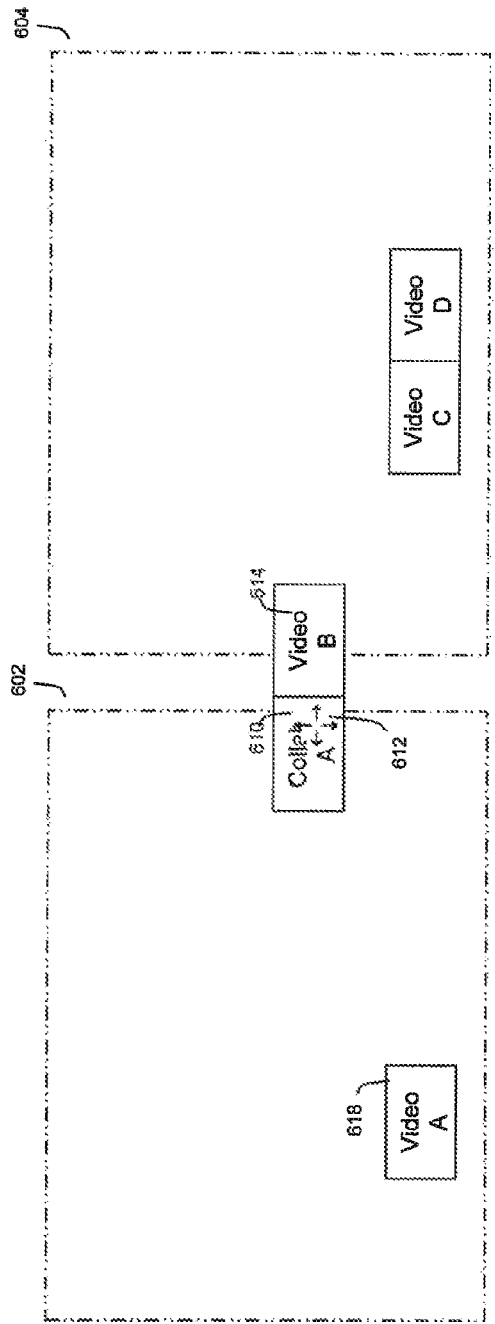

FIG. 6b illustrates an intermediate point in the drag-drop process. Note that in order to preserve the preferred Round Table order Video B Thumbnail 614 is "pushed" ahead of the target thumbnail 610 by icon 612.

Figure 6C:
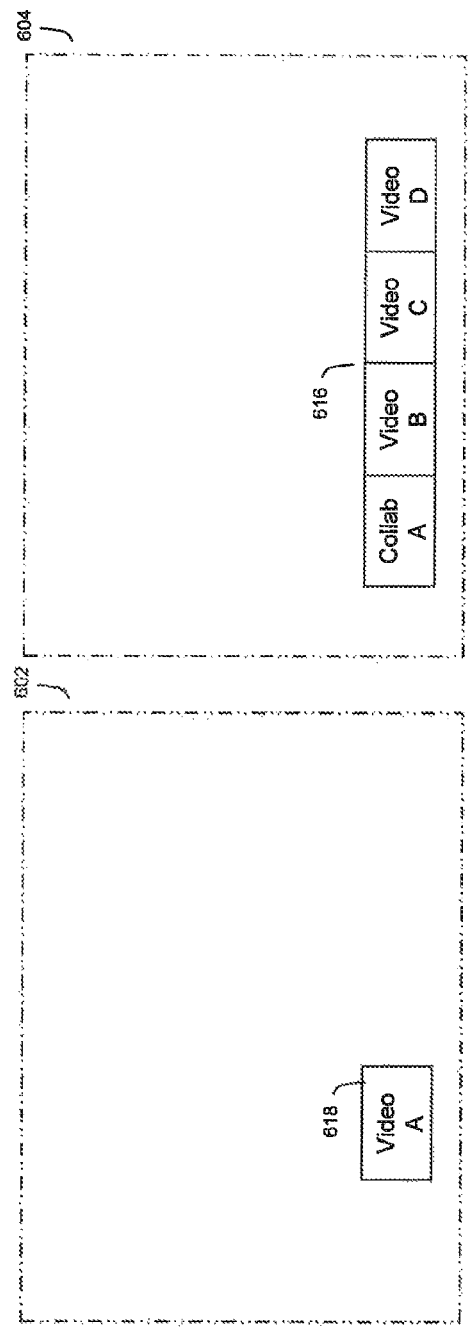

Assuming the user drags the icon 612 as far as the right screen 604 before releasing the mouse button, following typical GUI behavior, the drag is deemed complete and the dragged object is placed in the destination screen constrained, in this case, by novel filmstrip rules. There is only one preferred filmstrip configuration as shown in FIG. 6c item 616. Thumbnail Video A 618 remains as the only thumbnail on the left screen 602.

A number of details shown in FIG. 6 are a matter of detail design and not necessary for the invention. In FIG. 6a Collab A 603 was promoted as is the preference for a newly added item. However the promotion is not shown in FIGS. 6b and 6d, whether it stays, moves to the right screen, or is no longer promoted is a matter of design or user preference. The filmstrip 616 is shown centered, Thumbnail 618 remains where it was, and again centering, or lack of, is a matter of design or user preference. Both filmstrips 616 and 618 have the same scale as before the drag, this may or may not be the case depending not only on design or user preference but also the number of parties and sources of video and Collab material.

In one embodiment when a second (or subsequent) thumbnail is right-clicked on a screen already occupied by a promoted video (or Collab) and another screen has free space (which could be tiled space) then the second video is promoted to the alternate screen.

The following detailed description applies to a solution where multiple video images are displayed on a single video monitor. A separate description for a solution for multiple monitors follows.

In order to implement the filmstrip in a timely fashion, the existing video and desktop windows are used. Each frame in the filmstrip is a separate top-level window, which is the same window that will be re-sized and displayed in the main view region when selected. Preferably, the filmstrip should only be visible when two or more videos or computer-desktops (collabs) are available to be displayed on a single panel (this includes local video/collab as well)

Each video and desktop, when in the filmstrip representation, does not have title bars or borders to move or re-size windows. This allows the integrity of the filmstrip to be maintained, that is, videos and desktop representations that are in the filmstrip remain in the filmstrip. Other forms of interaction with the videos and desktops are removed: mouse movements and clicks on a desktop would have no effect, the zoom, crop, and switch camera buttons on the viewers are removed, clicking and dragging on the video viewer does not cause panning When the filmstrip does not fill the entire horizontal bottom band, a handle can be added at the left end of the filmstrip that users to click and drag to move the film strip if they desired. A space can be left in the filmstrip behind the position where the camera is expected to be, so that the entire filmstrip is visible.

The windows in the filmstrip remain always on top. The filmstrip would appear almost as picture-in-picture on top of what is being viewed. That is, if a video is full screen, it will be partially covered by the filmstrip. Desktops, however, would not be placed beneath the filmstrip, by default, and the appropriate scaling would be automatically applied to ensure this is the case.

Items in the filmstrip would appear in their round-table order: Videos appear left-to-right in the order they would appear in a clock-wise direction if you walked around the round table, starting at the position to your left. Desktops would appear to the right of the person who owns them. The local video and any local desktops would appear on the far right. The initial height of videos in the filmstrip would be ⅙ of the screen height. If necessary, however, items in the filmstrip would shrink to accommodate new resources. No scroll bars would appear. Initially, videos being displayed on screen would be represented by pictograms in the filmstrip, until we are capable of rendering two views of the same video on the same screen at the same time.

Interactions

In general, N videos or desktops could be displayed at once, and there is no need to initially set a limit. The videos should be displayed left to right in a single row, rather than stacking them (i.e. emulate Ardbeg, not Ardmore). Clicking, Ctrl-Clicking, and Shift-Clicking are mechanisms for choosing which videos and collabs are displayed.

The familiar semantics of clicking, shift-clicking, and ctrl-clicking for selections are preserved. Videos and collabs are considered different classes of windows. Clicking a collab will never displace a video. Clicking a video will never displace a collab.

Clicking a video thumbnail will cause it to replace the existing videos. Clicking a collab thumbnail will cause it to replace the existing collabs. The simple case is, only one video is displayed, and clicking a thumbnail swaps them out. The complex case is when two videos are displayed. All of the currently displayed videos are returned to the film-strip, and the one that was clicked is displayed.

Clicking a pictogram for a video or desktop that is already displayed has the same effect as clicking it if it had not been displayed. If it was not maximized, it becomes maximized.

If it was not the only video being displayed, it becomes so after being clicked—all other displayed videos are returned to the filmstrip. Ditto for collab. If it was the only video being displayed, and was maximized, it has no effect.

When we move to multi-screens, then clicking on a video or desktop might first choose a screen, and affect only that screen, and not the resources displayed on other screens. Ctrl-Clicking a thumb-nail will alter the number of videos or desktops that are displayed.

Ctrl-Click on a video or desktop that is not currently displayed causes it to be displayed, but does not remove any of the videos or desktops currently being displayed, Ctrl-Click on a pictogram for a video or desktop that is currently displayed causes it to be returned to the filmstrip, and not replaced with any others. If this was the only video or desktop being displayed, then the result will be no video or no desktop is displayed Shift-Clicking is like Ctrl-Clicking, but selects a contiguous region of the videos and desktops to be displayed. I t is also desirable to drag and drop videos and collabs from the film-strip to utilize dead space, if desired, and to replace the contents of a selected window, if desired. This may have the effect of re-ordering the round-table (but that will not likely apply to single-screen systems).

Windows in the filmstrip cannot be moved around independently. The filmstrip should seem as a single window with a handle at the left that can be used to drag it left or right. Windows outside the filmstrip can be moved around at will, as in the past, because they have a title bar and borders. If only one window or desktop is displayed, clicking on another window or desktop will cause a swap of the media, which may reshape for aspect ratio, but will otherwise not cause it to move or resize Ctrl-Clicking on another window or desktop, of if there are multiple windows displayed, normal clicking, will cause a complete re-layout, moving all resources back to the single row in round table positioning. Minimizing a video or desktop should return that video or desktop to the live view in the filmstrip. That is, it has the same effect as ctrl-clicking on the filmstrip pictogram representing it.

Window Behavior/Window Manager Considerations
    Windows in the film-strip:
        No entry in task bar
        No title bar
        No border
        No mouse/keyboard interactivity
        Always on top
    Windows displayed in content area
        Have entry in task bar until no longer displayed
        When resource is not displayed in content area, no entry in task bar for that resource. Only way to access that window is through the filmstrip.
        Have title bar
        Have border
        Normal mouse/keyboard interactivity
    Whole Film-strip
        No entry in task bar
        No title bar
        No border
        Always on top
        Special drag handle to move it within confined space at bottom of screen Resource Selection Model
    Automatic Selection of Resources
    While the filmstrip is intended to be primarily user driven, there are a few times when it makes sense, and is in fact essential to the user experience, for the HD Controller to automatically select resources from the filmstrip to be displayed. Specifically:
        When the user specifically drags a local resource to the wall, it is implied that they want to view that resource immediately, so it should be added to the selection.

When the user enters into a videoconference with a remote party, the remote video should be considered more important than the local video, and should be displayed, replacing the local video, if present.

Similarly, when a remote user shares a desktop, this signifies a transition from a videoconference to a collaboration session, and thus the remote desktop is the most important resource, and should be displayed, replacing the local desktop, if present.

Generally, if there are resources shared to the local wall, it can be assumed that the user wishes to view at least one of them. Therefore, if ending a resource share results in no resources being selected, where before, there were resources selected, and there are yet resources shared, we must choose one of the remaining resources to share.

This leads to the following rules:

1. The appearance of a new local resource or set of new local resources, which is not accompanied by new remote resources, results in those new local resources becoming selected. If they are accompanied by new remote resources, it is assumed they have been shared automatically by the session controller in response to receiving a remote share from a remote user, and the local resources are then not automatically selected.
2. The appearance of a new remote media type (either remote video or remote desktop) signifies a transition to a new mode of operations (where we consider three modes: local workstation, video conferencing, and remote collaborating). Thus, the new resource(s) are selected, and all local resources of the same time are deselected.
3. The ending of all the remaining selected resource shares results in searching for the most appropriate remaining resource share, and selecting it. We prefer remote videos, followed by remote desktops, then local desktops, and finally, the local video.

Manual Selection of Resources

There are certain actions that we expect will be common, and we need a selection model that makes these actions trivial. These actions are:

Selecting a single resource to be displayed at any given time.

Selecting a single video and a single desktop to be displayed at any given time.

Changing the speaker displayed without changing the desktop displayed (and vice versa).

Selecting and deselecting one (or a small number of) other resource(s).

This has given rise to the following behavior:

1. Clicking a video causes it to be selected/displayed, replacing any other video (or videos) currently selected/displayed. Similarly, clicking a desktop causes it to be selected/displayed, replacing any other desktop (or desktops) currently selected/displayed. In this way, we can select a single video and a single desktop to be displayed at any given time. Note that clicking a desktop doesn't replace the video(s), if any, and clicking a video doesn't replace the desktop(s), if any. In this way, we can easily change the speaker displayed without changing the desktop displayed, and vice versa.
2. Clicking on a video that is already the single video being selected/displayed causes it to become the only resource (video or desktop) being selected/displayed at that time. Similarly, clicking on a desktop that is already the single desktop being selected/displayed causes it to become the only resource (video or desktop) being displayed at that time. In this way, we can select a single resource to be displayed at any given time, while still being able to preserve the previously described behavior.
3. Ctrl+Clicking on any unselected/undisplayed resource adds it to the selection to be displayed without displacing any other selected/displayed resources. Ctrl+Clicking on any selected/displayed resource removes it from the selection to be displayed without affecting any other selected/displayed resources. In this way, we can easily select extra resources to be displayed beyond the single video and desktop we can cause to be displayed with the previously described behavior. We refer to this behavior as toggle selection.
4. We want the users to be otherwise able to manipulate windows in the ways they always have, which includes minimizing a window they do not wish to see at present. However, we don't want the videos to be displayed in the task bar, since they are instead displayed in the filmstrip. Further, we expect the filmstrip to accurately reflect what is being displayed. Therefore, if a window is minimized, it is deselected.

Bulk Selection of Resources

While not likely a common action, bulk selection complements the simple selection and toggle selection actions. Specifically, it is a behavior that users are used to in other aspects of operating a desktop computer. Where a normal click is simple selection, and a ctrl+click is toggle selection, a shift+click is generally a bulk selection.

Essentially, a previously selected item is designated the "leader", then a shift+click on another item results in selecting that item, the leader, and all items in between, deselecting all others, resulting in a contiguous selected region. If there is no previously selected item to be designated the "leader", then the leader becomes the shift+clicked item, resulting in a single item selection. In our case, the "items" are video and desktop resources.

For bulk selection, we ignore the distinction between video and desktop resources that we adhere to in simple selection, because not to do so would result in a discontiguous selection region, which is contrary to the model most users are familiar with.

One behavior of bulk selection that is not well defined or uniform on other desktop platforms is the selection of the "leader". Our rules are simple. The most recent element to be added to the selection through any means except a bulk selection is the leader. However, we only keep memory of the current leader, and not previous leaders. Hence, if the current leader is removed from the selection in any way, we don't know the most recent element to be added to the selection. We instead choose the leftmost selected item. If the selection is empty, then there is no selection leader.

This results in a simple implementation of bulk selection that is intuitive to the user.

Geometry Preservation

We want to be sure to provide the best layout initially, for the given set of selected resources, and then we leave it up to the user to move or resize windows as desired. Once the user has made modifications, they've given us a hint about their preferences, and we want to take them into account when we perform later layouts. Especially since the user will be quite annoyed if they have to re-modify windows in the same way each time we do a new layout. Therefore, we want to do some amount of geometry preservation to ensure that once people start making modifications, we respect those modifications.

One solution is to use a longest common subsequence diff algorithm to match new windows to old windows, and find out which new windows don't have a corresponding old window to match, etc. The rules would then be:

Swap: Keep geometry (shrink or grow on vertical access to get aspect ratio right)

Add: If there is a clean line between all resources on the left and all resources on the right, then open up a space between the resources in the right location by scaling down all resources appropriately, and insert the new resource. Otherwise, do a fresh layout.

Delete: If deleting leaves a new band of unused space, then upscale all other resources to fill that band. Otherwise, do nothing.

If multiple changes exist, they should be considered in this order: Swap, Delete, Add.

Manually invoking a new layout always starts fresh.

Film Strip Implementation on Systems with Multiple Video Monitors

Our implementation of the filmstrip viewer is closely associated with the Magor Round Table. It is a deliberate design decision to tie the two together. However, the following sections (but the last) make an essential assumption: there is a camera on every active screen in the round table session. Screens without cameras (a.k.a. naked screens) are not compatible with other naked screens at the round table. As long as only one is present in a conference we can keep perceived gaze angle (and the trust of our users) intact.

General Operation

1. Filmstrip viewers are screen resources. They are instantiated when screens are full and another image is advanced to one of the screens. The strip viewer is then shown at the bottom of the screen with two (or more) images.
2. When images are advanced from the viewer to the screen they are ALWAYS placed in round-table order.
3. Filmstrip viewers will be instantiated on any screen that has more than one image assigned to it.
4. Images that are manually edited in shape or location remember their new settings and location when they are minimized back to the strip and re-selected.

Managing Image Assignment to Screens and Cameras

Image assignment to screens:

Consider a system of two screens with two cameras. It is in an active session with four other systems with two shared collab screens for a total of seven images including the local-view split between the two screens using the filmstrip viewer. In this section we will discuss how images might be assigned to screens and under what conditions they could move from one screen to the other. We assume that collab screens are displayed to the right of the image of the person who shared it and the local view appears locally as the right-most image (see the how the film strip will look section of the original specification of the film strip.

We expect as a convention the default assignment of images to screens will be an even distribution starting on the left-most screen and that collabs and their owner's images will be kept to the same screen unless in a two-party call when the video image would be on one screen and the collab(s) on the next. The local view is not counted in the distribution, but shared collab images are counted. In the example below Av is the video image from system A; Ac is the collab image from system A and so forth.

Default Enlarged Image

The enlarged images on each screen would be the last image added to the conference unless the user had made a specific selection since the last image was added. We presume that when a new image is added to the conference it replaces the enlarged image on the screen it was assigned to.

Moving Images From One Screen to Another

There could be several ways to accomplish moving images from one screen to another. In the first phase of deployment images can only be moved if they've first been promoted to full size. In a later stage they could be moved by click-dragging the filmstrip image to another screen. However we cannot break the round table order so the following rule ALWAYS applies:

Round Table Rule 1: When an image from the round table is moved from one screen to another all images to the right (if moved right) or to the left (if it moved left) will also be moved to the same destination screen as the image.

Round Table Rule 2: When video images are moved to another screen the camera assignment (for the remote system) is ALWAYS changed to the camera on the new screen. The only exception is where there is no camera on the destination screen.

Note that moving a collab image to the right will not drag the video image of the system that shared it since the video image is to the left of the collab image. Moving a video image to the left will not drag the associated collab image(s) for that system to the destination screen either since the collab image is to the right of the video image. The stickiness of video images to their shared collab images is only relevant when joining a conference for the initial screen assignment and only if there are already two or more participants in the conference.

Changing Positions at the Round Table (Optional or Moderator-Supervised)

To change positions we need a visualization of the round table. I believe simple drawings that can easily be iconized and understood are best. Consider the examples below:

For example, an x could mark the position of the local room. To change position you could simply click-drag the x-cube to a position between other cubes; to swap places click-drag the x-cube on top of the position to trade with.

Green cubes could represent systems so collab images are not represented.

Opting out of the round table rules is represented in the example below. I've evolved the icons a little as well.

Considerations for dealing with naked screens (screens without cameras)

It has been standard practice in the first couple of years of deployments that two-screen systems were sold with one camera and three-screen systems were sold with two cameras. The presumption was that one screen could be used for collaboration and did not require a camera. Cameras were expensive—not the least because they required a whole computer to encode the data.

Problems arise with gaze-angle however. When two two-screen systems connect in any conference and both have naked screens on the same side (both left or both right), the other person will appear to be looking in the opposite direction when looking towards the naked screen. When only one naked-screen-system is in a conference or when they are of opposite types (left-right or right-left) then the other systems can be configured to cope with the limitation.

If gaze angle is important then the use of naked screens must be restricted in situations where they cannot conform to the required configuration.

Note that a two screen system with a single camera that could be placed on either screen or having two cameras but only enough processing power for one does not pose a gaze angle problem.

A compromise for two-screen-systems is to place the camera between the screens. We would lose direct eye contact, but would regain apparent gaze angle congruity. That is, people using the system would appear to be looking in the right direction when looking away. This is probably not acceptable given the social significance of not being able to meet a reciprocal gaze.

The filmstrip is a feature of a video endpoint connected to other video or collaboration endpoints. The filmstrip is located near the lower edge of the screen and is a single row of thumbnail videos from all sources at all conferenced endpoints. The filmstrip is always on top (i.e. always completely visible). Using known GUI methods a user can directly promote any thumbnail to the full screen, or an allocated fraction of the full screen tiled using to known methods. Alternative GUI actions cause the newly promoted thumbnail to either add to or replace existing promoted video or tiled videos.

Some of the more important variations are summarized in rank order of importance:

Thumbnails may be either true video streams or collaboration (e.g. presentation, document, web page, etc). Thumbnail videos are arranged horizontally in order as if sources were present at a virtual round table. Endpoint display capability comprises more than one monitor arranged in a horizontal configuration treated, for the purposes of the invention, as a single wide display. (i.e. the filmstrip and promoted videos use the entire width of all displays). Video sources are categorized. Certain source categories (e.g. real video) are allowed to fill the entire screen behind the filmstrip; other categories (e.g. collaboration) are not obscured by the filmstrip. In the event of a physical object (e.g. video camera) in front of any monitor the filmstrip includes a gap in the filmstrip so that the filmstrip is not significantly hidden by the camera. Promoted videos may be moved and sized using known GUI methods. Promotion may be automated to a degree using methods known and used in, for example, Multiparty Conference Units (MCU). Available monitor space may be reduced to allow for common GUI features (e.g. Windows Task Bar). Some or all videos may be placed in standard windows rather than being tiled.

Embodiments described so far relate to a mesh topology conference. Prior to this invention, and other prior art, non-mesh parties could participate in a mesh conference but without the personal control over video content and other benefits offered by the filmstrip invention in a mesh conference.

An important aspect of the invention relates to control to mixed topology conferences, i.e. multiparty conferences in which some endpoints are mesh interconnected and others are star connected to one endpoint in the mesh.

In this aspect of the invention non-mesh endpoint(s) user(s) can use the filmstrip user interface described above to exercise the same control over the their video presentation as would a mesh connected user.

In one embodiment this is achieved at a star connected endpoint using web browser technology. A web page including the filmstrip is hosted on a Star Server and displayed at the star endpoint location. The Star Server receives video from all mesh-connected endpoints constructing the filmstrip on the web page. User interaction with the filmstrip received by the Star Server results in the appropriate video stream being transmitted to the star endpoint.

FIG. 8 illustrates a typical mixed topology conference call. Endpoints 81, 82 and 83 are mesh connected. That is to say each endpoint transmits all its media (video, audio and data) to all other mesh endpoints via multiple connections 88 (media and call control, total count=n×(n−1)/2×2×2+). Star endpoint 84 connects to any one of the mesh endpoints, in this example it connects to endpoint 82 via connection 89. Other star endpoints may be similarly connected to the same or other mesh endpoints. Or multiple star end points, e.g. 85 and 86, may connect to an MCU (multipoint control unit) which has one leg connected to one mesh endpoint, in this case endpoint 83. All connections shown as a single line in the Figure typically comprise Video(s) Audios(s) media and data, each connection being a two-way IP connection. Connection 89 might, for example, be a Skype connection.

FIG. 9 illustrates a multiparty conference embodying the invention comprising mesh-connected endpoints 81, 82 and 83 and a star endpoint 84 connected to mesh endpoint 82. According to an embodiment of the invention a Star Server 91 and a computer 92 are added. The computer 92 and star endpoint 84 are co-located 93 i.e. a user or users at 93 can view and access both devices. Computer 92 is running a browser, or equivalent program (App) that can display a web page, or other suitable presentation, hosted by Star Server 91 and the web page 98 includes a filmstrip 99 as described in IDF 29 (esp. FIG. 4). The web page 98 has been associated with the conference and endpoint 84 using known methods, e.g. conference login procedure.

Computer 92 could be any computer for example a laptop of smart mobile phone (iPhone or IPad). Furthermore Endpoint 84 function may run on that same computer 92.

Endpoint 82 has been adapted to support the standard (e.g. SIP or H.323) connection 89 to the star endpoint 84 and also to the Star Server 91. When the Star Sever 91 discovers that there is one (or more) Star Endpoints participating in the conference, e.g. after a login, it will determine which mesh endpoint is connected to the star end point (or respective endpoints). Various methods of doing this would be apparent to a person skilled in the art, but one method would be to send messages to each mesh endpoint via control connections 95, 96 and 97 to respective mesh endpoints 81, 82 and 83. Such a message would indicate that a star endpoint is connected to the conference and its identification e.g. one or more of its IP address, MAC address, domain name, or extension number etc.

Figure 10:
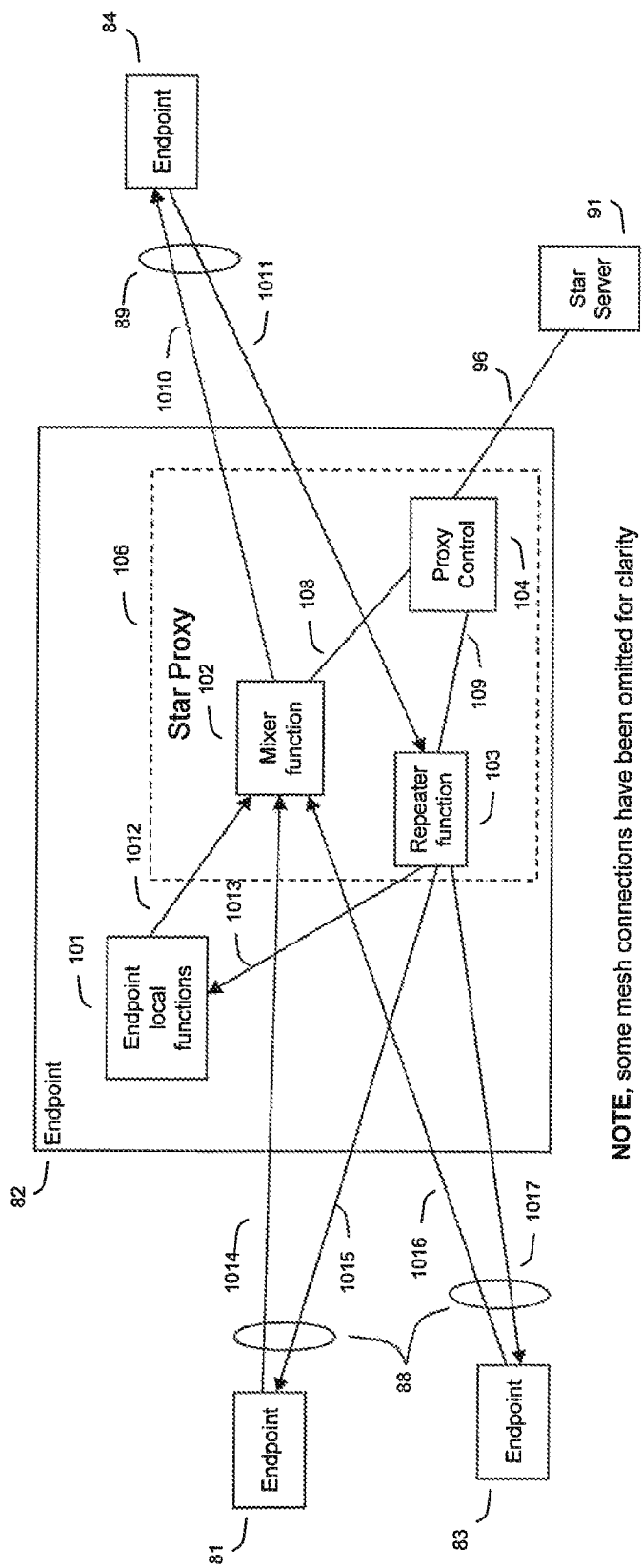
FIG. 10 depicts a non-mesh endpoint proxy.

Referring to FIG. 10, a mesh endpoint 82 is shown, it has been adapted to include a Star Proxy function, similar to an embedded MCU. Connections such as 96 might terminate in the Proxy Control function 104.

Once an endpoint, in this case endpoint 82, has been designated as a proxy for the star endpoint 84 it will instantiate local Mixer and Repeater functions which will act as a mesh proxy for the star endpoint. Control connections 108 and 109, for example software 'handles', control the connection and operation of the Mixer and Repeater respectively using well-known MCU technology.

The Proxy Control function 104 will communicate with other Mesh Endpoints in the conference using any method known to set up a mesh conference, for example the same procedures used to connect endpoint 82 to the mesh before being designated star proxy. Most call set-up connections which function in a well-known way, e.g. SIP, and have been omitted from FIG. 10 for clarity. Thus Mixer function 102 will be connected to the transmit media connections (video, audio and data) of endpoints 81, 83 and local endpoint 101 via connections 1014, 1016 and 1012 respectively. Similarly Repeater function 103 will be connected to the receive media connections (video, audio and data) of endpoints 81, 83 and local endpoint 101 via connections 1015, 1017 and 1013 respectively. The output of Mixer function 102 is connected to star endpoint 84 via connections 1010 (video, audio and data). The input of Repeater function 103 is connected to star endpoint 84 via connections 1011 (video, audio and data). The operation of Mixer 102 and Repeater 103 are essentially the same as similar functions within the local endpoint 101 and typically these same procedures would be used to implement the bodies of the Mixer and Repeater functions.

Connections are described as video, audio and data all may or may not be present in a given conference call.

The Star Server 91 is shown as a separate computer but it could be a program running on a computer within one of the mesh endpoints e.g. 11 in FIG. 1. The browser is described as a program running of a separate computer 92 but it could be a program running on a computer in endpoint 84. In the above Endpoint local functions 101, Proxy Control 104, Mixer 102 and Repeater 104 are shown as discrete functions for the purpose of making the invention clear. In many embodiments these functions may be much more integrated and not easily identifiable as discrete functions.

In the preferred embodiment SI P protocol is used to establish conferences but other protocols could be used, e.g. H.323.

In the above description, connection of a single star endpoint to a mesh conference is described. Any number of similar Star Proxies 106 comprising Proxy Control 104, Mixer 102 and Repeater 104 could be integrated into a single mesh endpoint or multiple mesh endpoints allowing any number of star endpoints to participate in a conference that has a mesh topology at the core. In which case they preferably share a common Proxy Control and other functions.

Alternatively the Star Proxy(s) 106 could be embodied in a standalone computer or integrated into the Star Server 91, however there is benefit in integrating the Star Proxies 106 into Mesh Endpoints 82 because doing so minimizes the number of network connections.

Taken to the extreme, which would be understood by persons skilled in the art any or all functions constituting the Star Proxy 106 and or Star Server 91 could be implemented in a virtual computer or computers within a virtualized computer environment known as a cloud.

Whether Star Proxies 106 are integrated into Mesh Endpoints 82 or the degree to which they are integrated need not be a design decision but rather a decision made at installation time or even dynamically at the time a conference is scheduled or set up or as participants join and leave ad hoc. Such a resource allocation decision may depend on the quality of video and or audio media in the specific conference.

In a further ease the 'star endpoint' could in fact be an MCU 87 itself connected to multiple star endpoints as depicted in FIG. 8. In such a case computer 92 displaying the filmstrip 99 (FIG. 10) would typically be co-located with one of the star endpoints 85 for example so that users could conveniently view and interact with each device.

The proxy allows the endpoint 84 to participate in the conference in much the same way as if it were part of the mesh topology. For bandwidth considerations, it is undesirable to stream high definition video to the endpoint 84 from each mesh-connected endpoint. In accordance with embodiments of the invention it is only necessary to stream the full size feed from the endpoint currently promoted to the main window. Only reduced size feeds need by streamed to create the filmstrip, either to the endpoint itself or to a browser running on a computer co-located at the endpoint. The user can then select a frame on the filmstrip for promotion, and the promoted feed is then substituted for the current full sized frame feed.

In this way, the non-mesh connected endpoint is able to benefit from the advantages of being able to view all the video feeds at reduced size in the film strip and select any of the feeds for promotion without consuming the bandwidth on the link 89 that would be required to carry all the high definition feeds to the endpoint 84 simultaneously.

In all cases described above all end points, star or mesh, benefit from ability to use the filmstrip described with reference to FIGS. 1 to 7.

I claim:

1. An endpoint for a teleconferencing system wherein multiple parties participate in a teleconference from different locations, comprising one or more display screens, and which is configured such that a filmstrip containing simultaneous images or icons representing all of the participants in the teleconference is displayed on said one or more display screens in a spatial relationship that represents their real-world or virtual-world spatial relationships, wherein the end participants are connected over a mesh network, and a proxy at one of the endpoints receives video feeds for presentation to a user at a non-mesh connected endpoint, wherein the proxy is associated with a server for presenting the video feeds at reduced size to a user located at the non-mesh connected endpoint,
   a control function to permit the user to select one of the video feeds for promotion, and wherein in response to a command from the user, the proxy sends the promoted fled as full size video to the non-mesh connected endpoint.

2. An endpoint as claimed in claim 1, wherein the star server constructs the filmstrip on a web page accessible by the end user.

3. A teleconferencing system comprising:
   a plurality of endpoints, at least some of which are connected in a mesh configuration and at least one of which is connected in a non-mesh configuration to a selected one of the mesh-connected endpoints, and which are configured such that a film strip with frames containing reduced-size video feeds from the conference participants is displayed at the mesh endpoints;
   a proxy at the selected mesh-connected endpoint for the non-mesh connected endpoint and connected to each of the mesh-connected endpoints to receive video feeds from the mesh-connected endpoints for the non-mesh connected endpoint;
   a server associated with the proxy for serving the film strip with frames containing reduced-size video feeds from the mesh-connected conference participants to the non-mesh connected endpoint; and
   a control connection permitting a user located at the non-mesh connected endpoint to select a video feed on the film strip for promotion to full size and to initiate transfer of the full size video feed to the non-mesh connected endpoint.

4. A teleconferencing system as claimed in claim 3, wherein the server is configured to serve the filmstrip to a browser co-located with the non-mesh connected endpoint.

5. A teleconferencing system as claimed in claim 4, wherein the browser is displayed on a computer co-located with the non-mesh connected endpoint.

6. A teleconferencing system as claimed in claim 5, wherein the proxy and server are merged into a virtualized environment.

7. A teleconferencing system as claimed in claim 3, wherein the frames are displayed in a spatial relationship that represents the participants as being located at a virtual table with the conference participants being envisaged as sitting round the virtual table.

8. A teleconferencing sys e as claimed in claim 7, wherein the virtual table is a round table.

9. A teleconferencing system as in claim 7, wherein the spatial relationships are preserved across the system so that the display at each endpoint represents the view at that endpoint of the spatial relationship of the participants at the virtual table.

10. An endpoint for use as a mesh-connected endpoint in a teleconferencing system comprising a plurality of endpoints, at least some of which are connected in a mesh configuration and at least one of which is connected in a non-mesh configuration to a selected one of the mesh-connected endpoints, wherein a film strip with frames containing reduced-size video feeds from the conference participants is displayed at the mesh endpoints, the mesh-connected endpoint comprising:
- a proxy for connection to each of the mesh-connected endpoints to receive video feeds from the mesh-connected endpoints for the non-mesh connected endpoint;
- a server associated with the proxy for serving the film strip with frames containing reduced-size video feeds from the mesh-connected conference participants to the non-mesh connected endpoint; and
- a proxy controller permitting a user located at the non-mesh connected endpoint to select a video feed on the film strip for promotion to full size and to initiate transfer of the full size video feed to the non-mesh connected endpoint.

\* \* \* \* \*